United States Patent [19]

Koepke et al.

[11] 4,263,789
[45] Apr. 28, 1981

[54] TORQUE-RESPONSIVE DRIVE COUPLING FOR ROLLER CONVEYORS

[75] Inventors: Frederick W. Koepke, Livonia; William Kuhn, Plymouth; James H. Patrick, Redford, all of Mich.

[73] Assignee: Centri-Spray Corporation, Livonia, Mich.

[21] Appl. No.: 16,393

[22] Filed: Mar. 1, 1979

[51] Int. Cl.³ ............................................. F16D 7/02
[52] U.S. Cl. ................................. 64/30 D; 64/30 R; 64/27 NM; 192/56 K
[58] Field of Search ............ 64/29, 30 R, 30 C, 30 D, 64/30 A, 27 NM; 192/56 R; 198/781

[56] References Cited

U.S. PATENT DOCUMENTS

| | | | |
|---|---|---|---|
| 3,282,387 | 11/1966 | Becker et al. | 192/56 R X |
| 3,688,522 | 9/1972 | Schmuck | 64/29 |
| 3,937,036 | 2/1976 | Sauerwein | 192/56 R X |
| 3,942,338 | 3/1976 | Furlette et al. | 64/30 D |
| 3,991,590 | 11/1976 | Brems et al. | 64/29 |
| 4,056,953 | 11/1977 | Furlette | 64/30 D |
| 4,142,616 | 3/1979 | Dekonnick | 192/56 R |
| 4,143,525 | 3/1979 | Major | 64/30 D |
| 4,199,964 | 4/1980 | Grey | 192/56 R |

Primary Examiner—Henry K. Artis

Attorney, Agent, or Firm—Joseph W. Farley

[57] ABSTRACT

In a power driven roller conveyor having a plurality of rollers each connected to a shaft and a plurality of driven sprockets one of which is rotatably mounted on each of the shafts, a torque-responsive coupling is interposed between a driving member connected to each sprocket and a driven member connected to each shaft so that the rotation of any roller will be interrupted if the resistance to rotation exceeds a desired value, thereby permitting articles on the conveyor to be stopped and accumulated without undue scuffing and wear on the articles or on the rollers. The coupling consists of a wobble plate which is connected to the driven member for oscillating movement about a center coincident with the axis of the shaft and which has a surface disposed transversely to the axis of the shaft and facing the driving member. The wobble plate is spring urged toward the driving member. A driving ball, rotatably mounted in a socket in the driving member engages and displaces the surface of the wobble plate to an oblique relation with the axis of the shaft, thus forming, a coupling which will transmit motion until the resistance thereto is sufficient to overcome the spring bias on the wobble plate. The ball then rolls on the surface of the wobble plate which oscillates.

14 Claims, 4 Drawing Figures

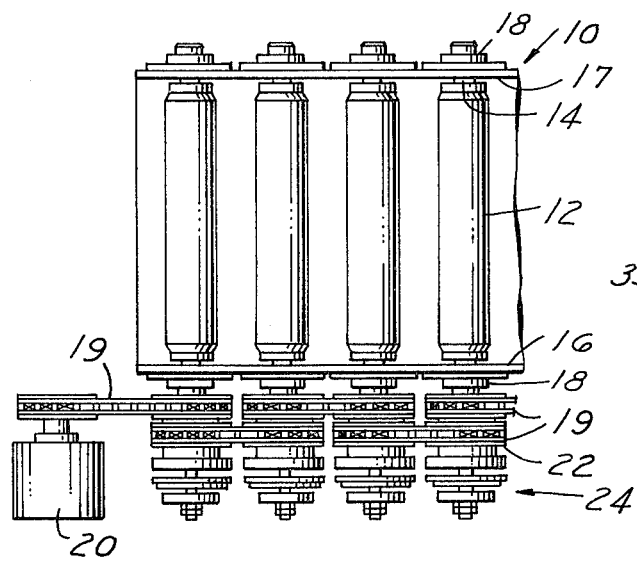
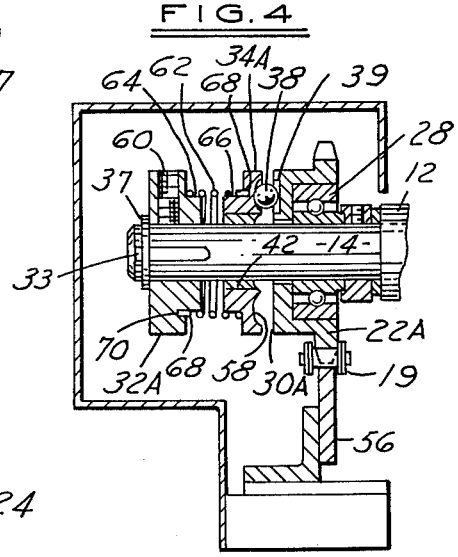
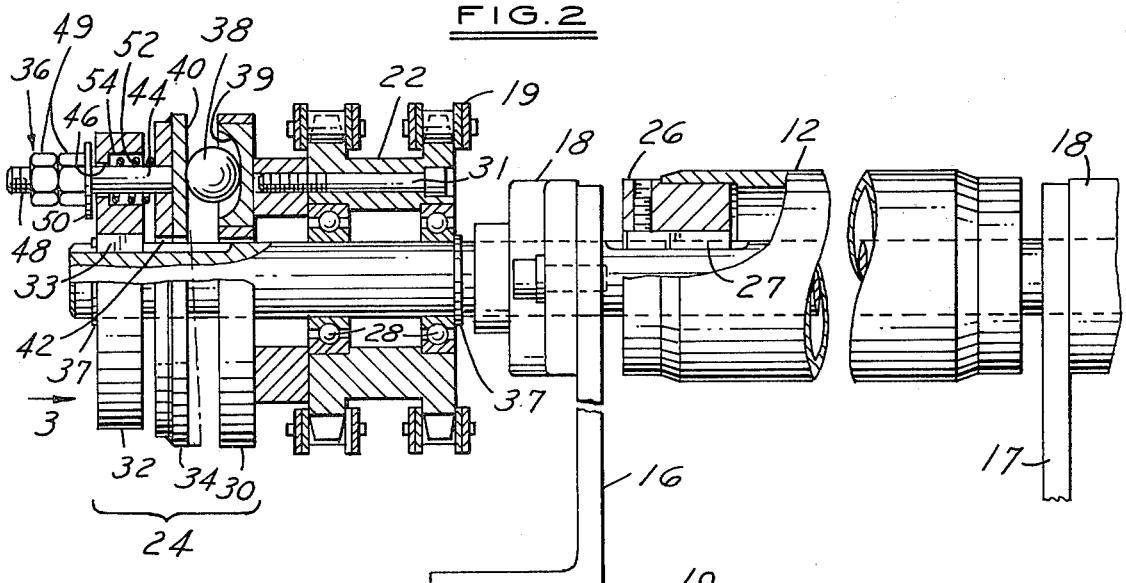
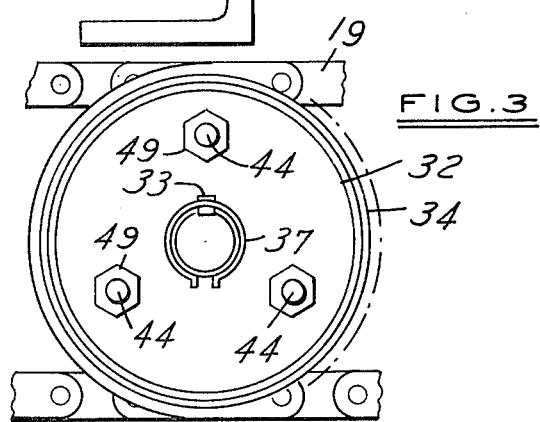

TORQUE-RESPONSIVE DRIVE COUPLING FOR ROLLER CONVEYORS

This invention relates to a torque-responsive coupling, and particularly to such a coupling for use in transmitting rotary motion from a drive train to individual rollers of a live roller conveyor. If the resistance to rotation of a roller increases, as when an article being advanced by the roller is stopped, the coupling responds to the resulting increase in torque and interrupts the transmission of motion. The roller stops until the resistance to its rotation decreases, thus preventing scuffing and wear on the rollers and the articles being conveyed.

Examples of such a torque-responsive conveyor roller drive are found in U.S. Pat. Nos. 3,942, 338 and 4,056,953. In the first of these patents a tubular roller is rotatably mounted on a driven shaft and the rotation of the shaft is transmitted to the roller by resilient cylinders compressed between the outer surface of the shaft and the inner surface of the roller. The second patent is similar except that the drive transmitting members are resilient balls. When the torque transmittable by these resilient members is exceeded, the roller stops and the drive transmitting members roll on the surfaces of the shaft and roller which they engage. This causes wear on the drive transmitting members and their eventual replacement, which is a relatively complex maintenance operation because they are located internally of the conveyor roller.

The present invention provides an arrangement in which the conveyor roller is connected to and directly driven by a rotatable shaft on which the roller is supported. An improved torque-responsive coupling is mounted on the shaft externally of the conveyor roller and transmits motion from a driving member rotatable on the shaft to a driven member connected to the shaft. Aside from the fact that this arrangement makes the coupling readily accessible for any maintenance required, the improved coupling of the invention is extremely smooth in operation and has great resistance to wear.

Briefly, the improved coupling comprises a wobble plate, or circular disc, mounted on one of the aforementioned driving and driven members for oscillating movement about a center substantially coincident with the axis of the conveyor roller shaft. The wobble plate is spaced axially from and is resiliently urged toward the other of the driving and driven members and has a surface which is disposed generally transversely to the axis of the shaft and faces the other member. A driving element, such as a freely rotatable ball, carried by the other member, at a radial spacing from the axis of rotation, engages and displaces the surface of the wobble plate to an oblique position relative to the axis.

When the maximum torque transmittable between the driving ball and the oblique surface of the wobble plate is exceeded, the driving ball rolls freely on the surface and causes the wobble plate to oscillate. This rolling motion continues until the torque requirement decreases. The action is smooth, the vibration is minimum, and the wear properties are readily enhanced by employing suitable physical properties for the driving ball and the surface it engages.

Other features and advantages of the invention will become apparent from the description to follow of the presently preferred embodiment disclosed in the accompanying drawings.

DESCRIPTION OF THE DRAWINGS

FIG. 1 is a plan view of a portion of a live roller conveyor constructed in accordance with the present invention;

FIG. 2 is an enlarged transverse elevation, partly in section, showing one of the rollers of the conveyor of FIG. 1 and the driving and coupling elements associated with this roller;

FIG. 3 is an end elevation taken as indicated by the arrow 3 of FIG. 2; and,

FIG. 4 is a fragmentary sectional elevation similar to FIG. 2 but showing an alternative construction of the invention.

DESCRIPTION OF THE PREFERRED EMBODIMENTS

In the roller conveyor 10 of FIG. 1, each of a plurality of rollers 12 is mounted on a shaft 14 supported between side frame members 16 and 17 on bearings 18 carried thereby. A drive train consisting of a series of sprocket chains 19 extends from a driving motor 20 through a dual sprocket 22 rotatably mounted on each of the shafts 14, and a torque-responsive coupling 24 on each of the shafts transmits the motion of the dual sprocket 22 to the shaft 14.

Further details of the construction are shown in FIGS. 2 and 3 for one of the rollers 12 and are repeated for each of the other rollers. A hub 26 at one end of the roller 12 is connected to the shaft 14 by a key 27, and ball bearings 22 rotatably support the dual sprocket 22. The coupling 24 includes a driving member 30 connected to the dual sprocket 22 by bolts 31, a driven member 32 connected to the shaft 14 by a key 33, a wobble plate 34, means 36 mounting the wobble plate 34 on the driven member 32, and a driving element in the form of a ball 38 carried in a socket 39 formed in the driving member 30 at a radial spacing from the axis of the shaft 14. Split rings 37, mounted in grooves on the shaft, locate the dual sprocket 22 and the driven member 32 axially and prevent separating movement between the driving member 30 and the driven member 32.

The wobble plate 34 is a circular disc having a face 40 which is disposed generally transversely to the axis of the shaft 14 and forms a planar drive surface directed toward and spaced axially from the driving member 30. A central bore 42 in the wobble plate 34 has a diameter greater than that of the shaft 14. The mounting means 36 supports the wobble plate 34 for oscillating movement about a center substantially coincident with the axis of the shaft 14, and in the illustrated construction the mounting means comprises three studs 44 secured to the wobble plate in equally spaced circumferential relation, as appears in FIG. 3. Each of the studs 44 projects axially and loosely through an aperture 46 is the driven member 32 and has a threaded end portion 48 engaged by adjusting and lock nuts 49 and a washer 50. Forming a part of the mounting means are resilient means, in the form of a compression spring 52 mounted on each of the studs 44 and seated in a counterbore 54 in the driving member 32, which bias the wobble plate 34 axially toward the driving member 30 so that the face 40 is engaged by the ball 38 and displaced to an oblique position (shown in broken lines in FIG. 2) with relation to the axis of the shaft 14.

Thus the face 40 of the wobble plate becomes a resiliently axially positioned, circular, inclined plane which is engaged by the driving ball 38 and imparts the rotary movement of the ball with the driving member 30 and sprockets 22 to the driven member 32 and thence to the shaft 14 and the roller 12. If the resistance to rotation of the roller 12 increases sufficiently, as by frictional engagement with a stopped article supported thereby, the resilient positioning of the wobble plate will be overcome and the driving ball will then roll on the face 40, causing the wobble plate to oscillate. When movement is being transmitted from the driving member 30 to the driven member 32, there is no relative movement between the driving ball 38 and its socket 39 or between the driving ball 38 and the wobble plate face 40. The driving ball acts as a fixed, motion-transmitting element. But when the coupling responds to an increased torque condition and interrupts the transmission of movement from the driving member 30 to the drive member 32, the driving ball 38 rolls in its socket 39 and on the wobble face 40 and acts like an anti-friction element. The surfaces involved in this rolling movement of the driving ball 38 can readily be provided with suitable wear-resistant properties.

The torque response or transmitting capability of the coupling 24 is determined by the axial force on the wobble plate or stiffness of the springs 52 and their number, by the radial spacing of the driving ball 38 from the axis of rotation (which spacing in the construction shown corresponds to the radial spacing of the springs 52); and by the degree of oblique positioning of the wobble plate face 40, adjustable in the illustrated construction by the nuts 49.

Similar features are incorporated in the lighter-duty, alternative coupling construction shown in FIG. 4 wherein corresponding parts are indicated by the same reference numbers. The conveyor roller 12 mounted on the shaft 14 is driven by a roller chain 19 which travels on a guide bar 56 and is engaged by the teeth of a sprocket 22A rotatably mounted on a bearing 28 carried by the shaft 14. A radially extending portion of the sprocket 22A forms the drive member 30A of the coupling and is provided with a socket 39 for the driving element, or ball 38, which engages an annular groove 58 in the radially extending face of the wobble plate 34A. The driven member 32A is connected to the shaft 14 by the key 33, and is positioned longitudinally of the shaft 14 by a set screw 60 and the retaining ring 37.

Mounting means for the wobble plate 34A comprises a resilient member in the form of a single compression spring 62 surrounding the shaft 14 and supported by cylindrical collars 64 and 66 provided on the driven member 32A and on the wobble plate 34A. Tabs 68 projecting axially at the ends of the spring 62 engage sockets 70 in the driven member 32A and the wobble plate 34A and cause the wobble plate 34A to be drivingly connected to the driven member 32A by the spring 62.

As in the previously described construction, the wobble plate 34A, having the enlarged central bore 42, is supported for oscillating movement about a center substantially coincident with the center of the shaft 14, and the annular groove 58 forms an inclined surface which is engaged by the ball 38 to impart rotary movement of the driving member 30A to the driven member 32A. The annular groove 58 also acts to maintain the wobble plate 34A in centered relation with the axis of the shaft 14, both during the transmission of motion through the coupling when the ball 38 acts as a fixed, motion-transmitting element, and during the response of the coupling to an increased torque condition when the ball 38 rolls in its socket 39 and on the annular groove 58 causing the wobble plate to oscillate.

Among other possible modifications to the constructions illustrated and described are the substitution for the driving ball 38 of a driving element in the form of a roller mounted with its axis radial to the axis of rotation, which would tend to increase the torque transmitting capability. Also, mounting means in the form of a resilient pad interposed between and bonded to the driven member and to the wobble plate could be substituted for the studs 44 and springs 52, or for the spring 62, to provide the resilient positioning and oscillatable movability of the wobble plate.

While the coupling of the invention has been described in its application to the driving of a roller of a conveyor, it is apparent that the coupling is adaptable to other uses in which a torque-responsive operation is desired.

What is claimed is:

1. In a roller conveyor having a plurality of article supporting rollers each mounted on a shaft and driving means rotatably carried by at least some of the shafts, the improvement comprising:
   a torque-responsive coupling for transmitting motion from the driving means to the shaft;
   said coupling having a driving member connected to and rotatable with the driving means and a driven member connected to and rotatable with the shaft, said members being spaced axially of the shaft;
   a wobble plate having a face disposed generally transversely to the axis of the shaft, means mounting the wobble plate on one of said members for oscillating movement about a center substantially coincident with the axis of the shaft, said mounting means resiliently biasing the wobble plate axially toward the other of said members; and,
   a driving element carried by and rotatable with the other of said members, said driving element engaging and displacing the face of the wobble plate against the resilient biasing of said mounting means to an oblique position with relation to the axis of the shaft.

2. A torque-responsive coupling according to claim 1, wherein said means mounting the wobble plate on one of said members comprises a plurality of studs secured to the wobble plate, each stud projecting axially through an aperture in said one member and having a threaded end portion, and an adjusting nut engaging said end portion.

3. A torque-responsive coupling according to claim 2, wherein said mounting means includes a plurality of coil springs, each spring being mounted on one of said studs and being interposed between the wobble plate and said one member.

4. A torque-responsive coupling according to claim 1, 2 or 3, wherein said other member is provided with a recess spaced radially from the axis of the shaft, and said driving element has a circular contour rollingly engageable with said recess and the face of the wobble plate.

5. A torque-responsive coupling according to claim 4, wherein said driving element is a ball.

6. A torque-responsive coupling according to claim 5, wherein said driving element is carried by the driving member and the wobble plate is mounted on the driven member.

7. A torque-responsive coupling according to claim 1, wherein said mounting means includes spring means interposed between the wobble plate and said one member.

8. A torque-responsive coupling according to claim 7, wherein said spring means comprises a plurality of circumferentially spaced springs, said springs and driving element being mounted at substantially corresponding radial distances from the axis of the shaft.

9. A torque-responsive coupling according to claim 7, wherein said spring means comprises a resilient member surrounding said shaft.

10. A torque-responsive coupling according to claim 9, wherein the wobble plate and said one member are each provided with a cylindrical collar and said resilient member comprises a compression spring supported by said collars.

11. A torque-responsive coupling according to claim 9 or 10, further including means for drivingly connecting said resilient member to the wobble plate and to said one member.

12. A torque-responsive coupling according to claim 9 or 10, wherein said driving element is a ball, and said face of the wobble plate is provided with an annular groove engaged by the ball.

13. A torque-responsive coupling for transmitting rotary motion from a driving member adapted to be rotatably mounted on a shaft to a driven member adapted to be connected to the shaft, wherein the improvement comprises:
 a wobble plate having a drive surface;
 means for connecting the wobble plate to one of said members with the drive surface facing the other of said members and extending generally transversely to the axis of rotation, said connecting means permitting oscillating motion of the wobble plate about a center substantially coincident with the axis of rotation and including means for resiliently axially positioning the drive surface of the wobble plate relative to the other of said members; and;
 a driving element carried by the other of said members, said driving element being adapted to engage and displace said drive surface against the resilient positioning of said connecting means to an oblique position relative to the axis of rotation.

14. A torque-responsive coupling according to claim 13, further comprising means for adjusting said position of the wobble plate drive surface relative to the other of said members.

* * * * *

UNITED STATES PATENT AND TRADEMARK OFFICE
CERTIFICATE OF CORRECTION

PATENT NO. : 4,263,789
DATED : April 28, 1981
INVENTOR(S) : FREDERICK W. KOEPKE ET AL It is certified that error appears in the above—identified patent and that said Letters Patent is hereby corrected as shown below:

Column 1, line 55, delete the comma (,);

Column 2, line 33, "22" (first occurrence) should read -- 28 --;

Column 3, line 21, before "face" insert -- plate --;

Column 4, line 32, after "spaced" insert -- apart --.

Signed and Sealed this

Twenty-first Day of July 1981

[SEAL]

Attest:

GERALD J. MOSSINGHOFF

Attesting Officer

Commissioner of Patents and Trademarks